(12) United States Patent
Closset et al.

(10) Patent No.: US 9,760,506 B2
(45) Date of Patent: Sep. 12, 2017

(54) CONFIGURABLE DATA PROCESSING SYSTEM BASED ON A HYBRID DATA AND CONTROL DRIVEN PROCESSING ARCHITECTURE

(71) Applicant: CANON KABUSHIKI KAISHA, Tokyo (JP)

(72) Inventors: Arnaud Closset, Cesson-Sevigne (FR); Pascal Rousseau, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 489 days.

(21) Appl. No.: 14/320,361

(22) Filed: Jun. 30, 2014

(65) Prior Publication Data
US 2015/0012676 A1    Jan. 8, 2015

(30) Foreign Application Priority Data
Jul. 2, 2013  (GB) .................................. 1311836.9

(51) Int. Cl.
*G06F 13/00* (2006.01)
*G06F 13/16* (2006.01)
*G06F 13/40* (2006.01)
*G06F 9/48* (2006.01)

(52) U.S. Cl.
CPC ........ *G06F 13/1621* (2013.01); *G06F 9/4887* (2013.01); *G06F 13/4013* (2013.01)

(58) Field of Classification Search
CPC . G06F 9/4887; G06F 13/4013; G06F 13/1621
See application file for complete search history.

(56) References Cited

U.S. PATENT DOCUMENTS

| | | | |
|---|---|---|---|
| 5,872,972 A * | 2/1999 | Boland | G06F 9/5033 718/102 |
| 6,266,718 B1 * | 7/2001 | Klein | G06F 13/1626 710/58 |
| 7,165,252 B1 * | 1/2007 | Xu | G06F 9/4887 718/100 |
| 9,417,873 B2 * | 8/2016 | Ben-Kiki | G06F 9/30079 |
| 2007/0083871 A1 | 4/2007 | McKenney | |
| 2008/0294820 A1 | 11/2008 | Croxford | |
| 2011/0179187 A1 | 7/2011 | Niigata | |

* cited by examiner

*Primary Examiner* — Tammara Peyton
(74) *Attorney, Agent, or Firm* — Canon U.S.A., Inc. IP Division

(57) ABSTRACT

A data processing system comprising a plurality of data inputs and of data outputs for processing input data and providing processed data to a data output. The system comprises a plurality of data processing hardware units, each being configured to process data within a predetermined latency and according to a data processing task of a predetermined type. The system further comprises a memory for storing a predetermined latency for each of the data processing hardware units and a controller configured to determine a type of a data processing task to be executed as a function of a source of data to be processed or of a destination of processed data and further configured to select one data processing hardware unit as a function of the determined type of the task to be executed and of latency constraints associated with the task to be executed.

17 Claims, 6 Drawing Sheets

| Data processing element index | 1 | 2 | ... | k |
|---|---|---|---|---|
| Status | free | busy | ... | free |

415-1

| Sequence ID | Input port ref. | Output port ref. | Max. latency | Current latency |
|---|---|---|---|---|
| 1 | 12 | 31 | 150 | - |
| 2 | 4 | 17 | 100 | 65 |
| ... | ... | ... | ... | ... |
| z | 26 | 41 | 250 | - |

CONFIGURABLE DATA PROCESSING SYSTEM BASED ON A HYBRID DATA AND CONTROL DRIVEN PROCESSING ARCHITECTURE

This application claims the benefit under 35 U.S.C. §119 (a)-(d) of United Kingdom Patent Application No. 1311836.9, filed on Feb. 7, 2013 and entitled "Configurable data processing system based on a hybrid data and control driven processing architecture". The above cited patent application is incorporated herein by reference in its entirety.

FIELD OF THE INVENTION

The invention generally relates to the field of data processing systems. More particularly, the invention concerns a configurable data processing system based on a hybrid data and control driven processing architecture.

BACKGROUND OF THE INVENTION

In video distribution systems and in particular in wireless video distribution systems, there is a need to handle multiple input and output video streams and to apply particular data processing to each of them, before transmitting the output video streams or after receiving the input video streams.

The nature of the data processing tasks to be performed on such video distribution systems vary as a function of the applications handling the video streams and of the transmission characteristics. For the sake of illustration and from an application perspective, data processing tasks can relate to data compression, in particular for data transmission when the transmission bandwidth is limited. Still for the sake of illustration and from a transmission perspective, data processing tasks can relate to formatting data frames and frame headers and to computing cyclic redundancy check (CRC) data in accordance with the transmission protocol to be used.

Moreover, such data processing tasks are to be done in view of performance requirements that can relate, for example, to real time constraints.

Striking a balance between resource optimization and versatility in view of planed usages generally leads to choosing between a data-flow based computational model (data-flow driven architecture) and a control-flow based computational model (control-flow driven architecture).

According to the data-flow based computational model, a sequence of data processing tasks (also referred to as operations) is predetermined and does not need centralized management to organize data transfer between data processing tasks and does not need scheduling execution of data processing tasks. In such a model, execution of a data processing task is triggered by the availability of the requested input data (or operands).

On the contrary, according to the control-flow based computational model, execution of a data processing task is associated with the execution of a program counter that translates a user program description in the context of data processing resource distribution.

Therefore, a data-flow based computational model is advantageously used when the sequence graph of data processing tasks is rather static over time. It is well adapted to intensive data processing requirements. Conversely, a control-flow based computational model is adapted to a huge dynamic sequence of data processing tasks, for example data processing tasks of a transmission protocol. It is well adapted to scheduling data processing tasks.

To support both intensive data processing requirements and control requirements, a hybrid model such as the hybrid model known as XPP (eXtreme Processing Platform) can be used. It is a data processing architecture based on a hierarchical array of coarse-grain adaptive computing elements called Processing Array Elements (PAEs), and a packet-oriented communication network. Control-flow dominated, irregular code (without loop-level or pipelining parallelism) is mapped to one or several concurrently executing Function-PAEs (FNC-PAEs) which are sequential 16-bit processor kernels. Regular streaming algorithms like filters or transforms can be implemented in the dataflow part of an XPP processor array.

In XAPP architecture, XPP objects are self-synchronizing: an operation is performed as soon as all necessary data input packets are available. The results are forwarded as soon as they are available, provided the previous results have been consumed. Event packets transmit state information. Events generated by arithmetic and logical unit (ALU) objects depend on ALU results or exceptions, in a way that is very similar to the state flags of a conventional microprocessor. These events are used to control the subsequent data processing tasks.

However, such a solution does not address resource optimization and latency control over intensive data processing.

In order to optimize the price of electronic circuits or chips embedding such data processing capabilities, for several contexts of use (application and transmission characteristics), one should rationalize architecture execution resources to provide a versatile circuit instead of multiplying specific implementations.

Accordingly, to solve these issues, there is a need for a configurable circuit architecture adapted to handle various performance constraints, to support processing based functional requirements (to handle data processing tasks from application perspectives), and to support protocol based functional requirements (to handle data processing tasks from transmission perspectives).

SUMMARY OF THE INVENTION

Faced with these constraints, the inventors provide a device for processing data.

It is a broad object of the invention to remedy the shortcomings of the prior art as described above.

According to an aspect of the invention there is provided a data processing system comprising a plurality of data inputs and of data outputs for processing system input data and providing processed data to a data output, the data processing system comprising:

a plurality of data processing hardware units, each data processing hardware unit being configured to process data within a predetermined latency and according to a data processing task of a predetermined type, to provide an item of processed data;

a memory for storing the predetermined latency for each of the data processing hardware units; and a controller configured to determine a type of a data processing task to be executed as a function of a source of data to be processed or of a destination of processed data and further configured to select one data processing hardware unit as a function of the determined type of the data processing task to be executed and of latency constraints associated with the data processing task to be executed taking into account the predetermined latencies stored in the memory, at least one source of data to be processed being linked to at least one data input of the plurality of data inputs and at least one destination of processed data being linked to at least one data output of the plurality of data outputs.

Accordingly, the invention provides a data processing system having a configurable architecture supporting processing based or protocol based functional requirements and various performance constraints.

In an embodiment, the controller is further configured to determine a type of a data processing task to be executed as a function of latency constraints associated with a data processing task to be executed.

In an embodiment, the controller is further configured to determine a type of a data processing task to be executed as a function of data to be processed.

In an embodiment, each data processing hardware unit of the plurality of data processing hardware units comprises at least one input interface and at least one output interface, the at least one input interface being communicatively coupled to one data input of the plurality of data inputs of the data processing system and the at least one output interface being communicatively coupled to one data output of the plurality of data outputs of the data processing system.

In an embodiment, each data processing hardware unit of the plurality of data processing hardware units comprises at least one status interface communicatively coupled to the controller for transmitting a status after the execution of a data processing task in the corresponding data processing hardware unit.

In an embodiment, each data processing hardware unit of the plurality of data processing hardware units comprises at least one command and parameter interface for triggering the execution of a data processing task in the corresponding data processing hardware unit.

In an embodiment, the data processing system further comprises a data communication interconnect for transmitting processed data provided by one data processing hardware unit of the plurality of data processing hardware units to a data input of another data processing hardware unit of the plurality of data processing hardware units.

In an embodiment, each data processing hardware unit of the plurality of data processing hardware units comprises at least one data interface for transmitting data to the data communication interconnect and receiving data from the data communication interconnect.

In an embodiment, the controller comprises a plurality of sub-controller modules, each of the sub-controller modules being associated with one data processing hardware unit, each sub-controller being configured to determine a data processing task to be executed as a function of a source of data to be processed or of a destination of processed data and as a function of latency constraints associated with a data processing task to be executed.

In an embodiment, the data processing system further comprises a control communication interconnect for transmitting processed control commands and parameters generated by one of the plurality of sub-controller modules to one of the plurality of sub-controller modules.

In an embodiment, at least one data processing hardware unit comprises a plurality of data processing hardware elements, the controller being further configured to select one data processing hardware element for executing a data processing task to be executed.

In an embodiment, a sub-controller associated with the at least one data processing hardware unit comprising a plurality of data processing hardware elements comprises a usage status table storing a state of each data processing hardware element of the data processing hardware unit with which is associated the sub-controller.

In an embodiment, each sub-controller of the plurality of sub-controllers comprises a data processing task manager adapted to generate a request for executing a data processing task.

In an embodiment, the data processing task manager is further adapted to determine whether the data processing task whose execution is requested is to be executed in the data processing hardware unit associated with the sub-controller or in another data processing hardware unit of the plurality of data processing hardware units.

In an embodiment, the controller comprises a processing status and map table containing information pertaining to a maximum latency and a current latency for at least one set of data processing tasks.

In an embodiment, the content of the at least one set of data processing tasks is dynamically modified.

In an embodiment, the controller dynamically updates the processing status and map table.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which.

DETAILED DESCRIPTION OF EMBODIMENTS OF THE INVENTION

Figure 1:
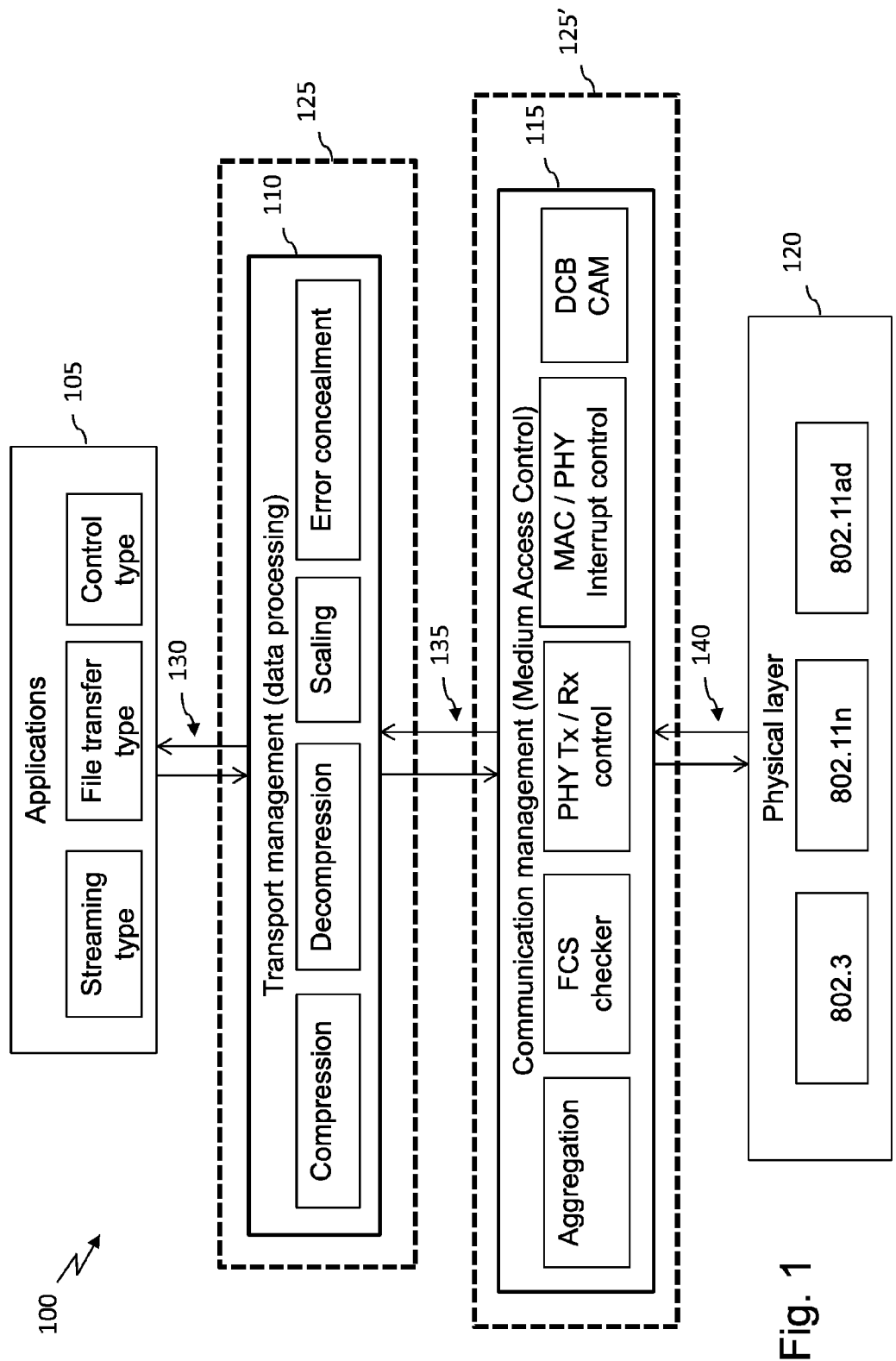
FIG. 1 illustrates an example of the architecture of an apparatus in which an embodiment of the invention can be implemented.

According to a particular embodiment, sets of data processing hardware units, also referred to as data processing circuits, are combined with control processing software module units, also referred to as sub-controllers or sub-controller modules, in a distributive manner to dissociate, in particular, control and data path interconnects between data processing hardware units handling data processing functions and sub-controller modules handling control processing functions. Data processing hardware units are organized by data processing types, each data processing hardware unit comprising one or several data processing hardware elements performing a same data process applies to different data. A sub-controller module is associated with each data processing hardware unit that is to say to all data processing hardware elements of the same type.

For the sake of conciseness, data processing hardware units are referred to as data processing units, or DPUs, and data processing hardware elements are referred to as data processing elements, or DPEs, in the following.

Each sub-controller advantageously comprises a data processing task manager (or computation engine) and a DPU resource sharing manager.

The data processing task manager is in charge of requesting the execution of local and remote data processing tasks, that is to say the execution of a data processing task in a data processing element of a data processing unit associated with the corresponding sub-controller or in a data processing element of a data processing unit associated with another sub-controller depending on the type of the data processing task to be executed.

Accordingly, the execution of data processing tasks is carried out as a function of a program description that is stored in a local memory associated with each sub-controller, as a function of a status of the data processing elements of the data processing unit associated with each sub-controller, and as a function of processing task execution requests received from other sub-controllers. Therefore, the processing task manager manages an ordered list of processing task execution requests.

Since a single processing thread or a very few processing threads are handled by each sub-controller and thanks to the use of local memory, the latency of the management of the processing tasks can be pre-determined.

Each DPU resource sharing manager is in charge of managing data processing resources of a data processing type for triggering the execution of data processing tasks. The decision to trigger the execution of a data processing task is based on pending requests, generated by the corresponding data processing task manager, that are stored in an ordered list of data processing task execution requests. These requests are dynamically re-ordered to optimize resource sharing to meet performance constraints, profiting from the pre-determined processing time of data sub-processing units associated with the sub-controller and of a latency status and requirement information stored within a processing status and map table.

Accordingly, a main data processing sequence is processed as a plurality of data processing tasks of one or several types, each data processing task being handled by a particular data processing unit according to its type.

A data processing sequence is typically a set of data processing tasks to be executed as a function of data received from a data input (or input port) to provide processed data on a data output (or output port). The data processing tasks of a processing sequence are typically dynamically determined. For the sake of illustration, a data processing task may or may not belong to the processing sequence as a response to the output of another data processing task of the processing sequence (e.g. a data filtering task may belong to a processing sequence or not depending on the result of a parity check).

FIG. 1 illustrates an example of the architecture of an apparatus in which an embodiment of the invention can be implemented. Such an apparatus can be, for example, a system for distributing video streams over a communication network.

As illustrated, the architecture 100 of the apparatus comprises four layers, a first layer 105 being an application layer, a second layer 110 being a transport management layer, a third layer 115 being a communication management layer, and a fourth layer 120 being a physical communication layer. A particular embodiment of the invention is directed to a versatile architecture 125 and 125', adapted to implement either the transport management layer 110 or the communication management layer 115.

Transport management layer 110 can receive data from and transmit data to application layer 105 via interface 130. Similarly, communication management layer 115 can receive data from and transmit data to transport management layer 110 via interface 135 and communication management layer 115 can receive data from and transmit data to physical communication layer 120 via interface 140. The communication interface between the transport management layer and the communication management layer can be implemented on a memory queue basis.

It is to be noted that the communication protocols used on interfaces 130 and 140 may vary as a function of the type of applications that run on application layer 105 and as a function of the type of physical layer 120, respectively. For the sake of illustration, the type of the applications that run on application layer 105 can be streaming, file transfer, and control transfer, each having its own constraints and performance requirements (e.g. bitrate, latency, control sequence, and bit or packet error rate). Still for the sake of illustration, the type of the physical layer may comply with the IEEE 802.3 wired transmission standard or with the IEEE 802.11n or 802.11ad wireless transmission standards (IEEE standing for Institute of Electrical and Electronics Engineers). Moreover, each physical layer has its own constraints and performance requirements (e.g. bitrate, latency, and control sequence).

Transport management layer 110 is mainly data processing oriented to support, for example, pre-processing of application data before transmission and/or post-processing of data received from a layer of lower level (i.e. typically the communication management layer) before transmitting the received data to the application layer. For audio and video applications, the data processing tasks can relate, in particular, to compression, decompression, filtering, scaling, and/or error concealment. These data processing tasks generally require real time scheduling, latency management, and/or, sometimes, the use of quite complex error concealment state machines. They generally rely on some data sub-processing tasks of common types such as arithmetic functions like FFT (Fast Fourier Transform), filters, interpolators, and correlation functions.

Communication management layer 115 is mainly protocol processing oriented. It is generally based on critical real time processes, often hardware implemented, to format frames, detect and recover errors, parse headers, and manage physical layer configurations, sequences, and interrupts. When multiple physical ports are to be used, multiple and concurrent communication management resources are used.

Figure 2:
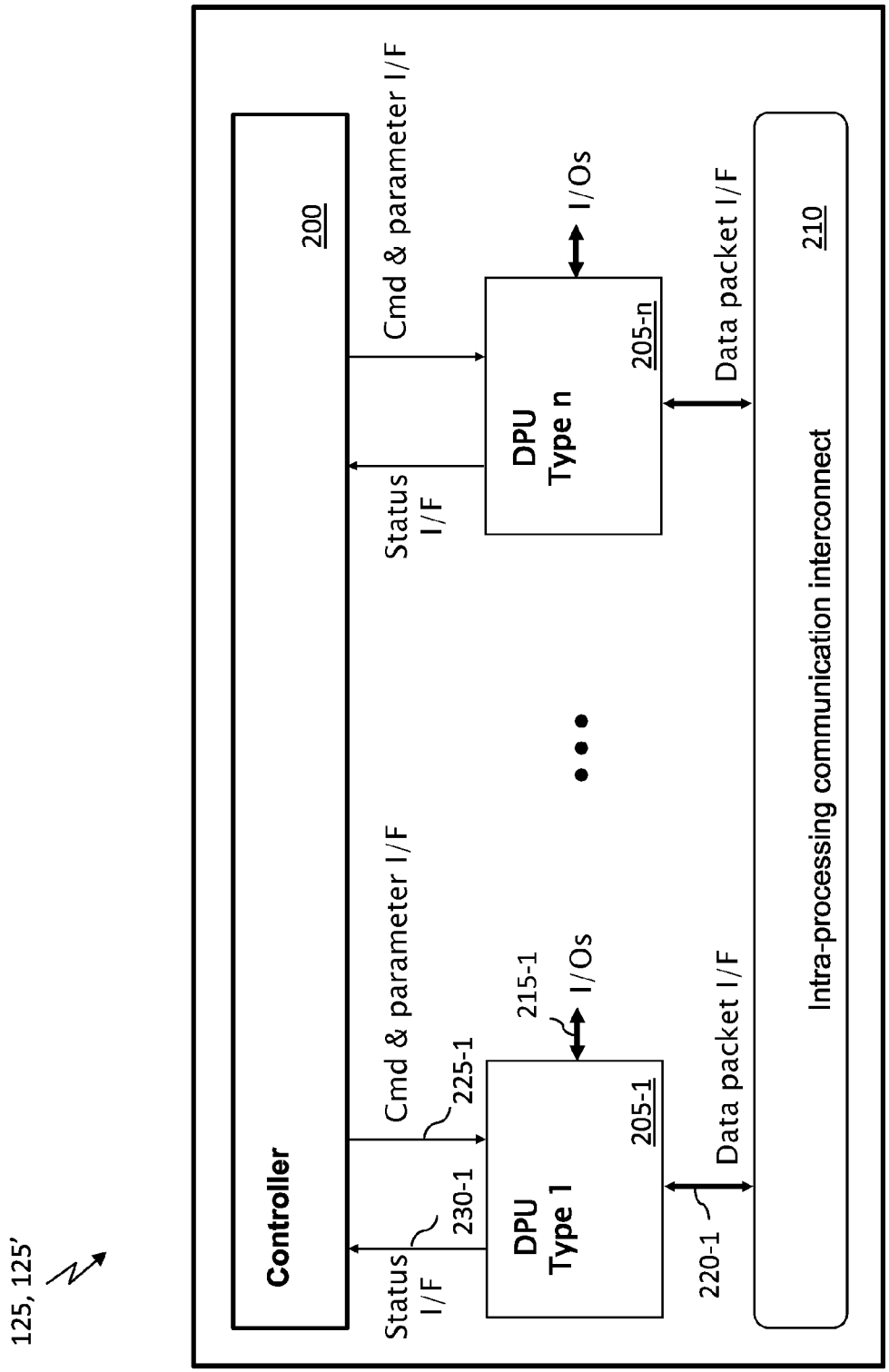
FIG. 2 illustrates an example of a versatile data processing system architecture according to a particular embodiment of the invention.

FIG. 2 illustrates an example of a versatile data processing system architecture according to a particular embodiment of the invention. Such a versatile architecture is adapted to implement either the transport management layer 110 or the communication management layer 115 represented in FIG. 1.

As illustrated, the versatile architecture 125, 125' comprises a controller 200, a set of n data processing units 205-1 to 205-n, and an intra-processing communication interconnect 210. According to a particular embodiment, intra-processing communication interconnect 210 is of the cross-bar type, with point-to-point message queues for data packet transfer, or of the shared memory type to store data packets between the execution of two consecutive partial data processing tasks. It can be accessed via ports, using port references, or via memory addresses.

Each of the data processing units 205-1 to 205-n is specific to a particular type of data processing like the ones disclosed previously (i.e. FFT, filters, interpolators, and correlation functions). In the illustrated example, n different types are considered (type 1 to type n). As mentioned above and described by reference to FIG. 3, each data processing unit preferably comprises a plurality of data processing elements that processes data independently (to apply a same process task to different data).

According to the illustrated embodiment, each of the data processing units 205-1 to 205-n comprises four global interfaces:
- an input/output (I/O) interface for communicating with external elements, in particular with applications of an application layer (e.g. application layer 105 in FIG. 1), with a physical layer (e.g. physical layer 120 in FIG. 1), and/or with a transport management layer (e.g. transport management layer 110 in FIG. 1) or with a communication management layer (e.g. communication management layer 115 in FIG. 1), in particular to import and export data. For the sake of illustration, data processing unit 205-1 comprises I/O interface 215-1;
- a data packet interface (data packet I/F) for receiving partially processed data from and/or transmitting partially processed data to data processing units (or more precisely to data processing elements), as data packets, over intra-processing communication interconnect 210. For the sake of illustration, data processing unit 205-1 comprises data packet interface 220-1;
- a command and parameter interface (cmd & parameter I/F) for receiving commands and parameters from controller 200 and more precisely from a sub-controller associated with the data processing unit. According to a particular embodiment, parameters may comprise an I/O port reference, data packet port references (if the intra-processing communication interconnect is of the cross-bar type) or read and/or write memory addresses (if the intra-processing communication interconnect is of the shared memory type), an identifier of a global processing sequence to which a current processing task to be executed belongs, and parameters relating to a current processing task to be executed such as segmentation or reassembling indications and header formatting indication. For the sake of illustration, data processing unit 205-1 comprises command and parameter interface 225-1; and
- a status interface for transmitting information regarding the status of the data processing unit (or more precisely of a data processing element of that data processing unit) to controller 200. Such information is typically transmitted after a data processing task handled by a data processing element of the data processing unit ends. Such information can comprise, for example, a task execution acknowledgement, a flag, a sequence identifier, and/or an effective processing task latency. Still for the sake of illustration, data processing unit 205-1 comprises status interface 230-1.

The command and parameter interfaces as well as the status interfaces are connected to controller 200 that is in charge of organizing resource sharing and scheduling execution of data processing tasks.

Figures 3, 5:
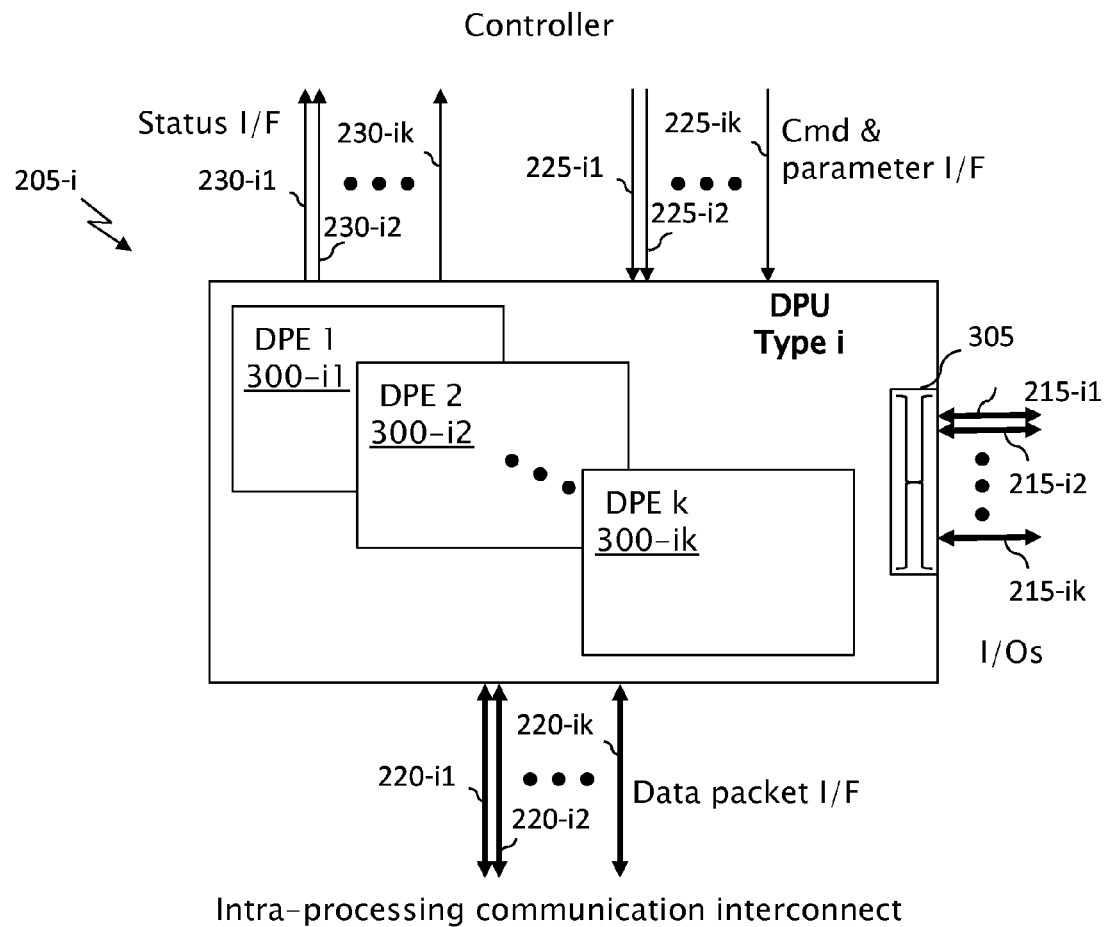
FIG. 3 illustrates an example of a data processing unit, as described by reference to FIG. 2, comprising several data processing elements.
FIG. 5 illustrates an example of a resource usage status table used to store the status of each data processing element of a data processing unit according to a particular embodiment.

FIG. 3 illustrates an example of the structure of a data processing unit, as described by reference to FIG. 2, comprising several data processing elements.

As illustrated, data processing unit 205-i comprises k data processing elements 300-i1 to 300-ik. It is to be noted that the number of data processing elements per data processing unit may vary from one data processing unit to another.

Each of the data processing elements 300-i1 to 300-ik can be considered as an instance of the same data processing element. Accordingly, all of the data processing elements 300-i1 to 300-ik are configured to perform independently the same data processing task (based on different data).

Since the data processing elements operate independently, they have their own interfaces. Regarding the I/O interface, the connection between a particular data processing element and an I/O port can be dynamically configured, for example using a switch 305, so that each data processing element can be connected to any I/O port.

As illustrated, data processing element 300-i1 is connected to one I/O port via one of the k I/O interface 215-i1 to 215-ik, to the intra-processing communication interconnect via data packet interface 220-i1, and to the controller via the command and parameter interface 225-i1 and via the status interface 230-i1. Likewise, data processing elements 300-i2 to 300-ik are each connected to one I/O port via one of the k I/O interface 215-i1 to 215-ik. They are also connected to the intra-processing communication interconnect via data packet interfaces 220-i2 to 220-ik and to the controller via the command and parameter interfaces 225-i1 to 225-ik and via the status interfaces 230-i1 to 230-ik, respectively.

All of the data processing elements belonging to the same data processing unit are managed independently from each other by a sub-controller dedicated to the data processing unit to which they belong.

Figure 4:
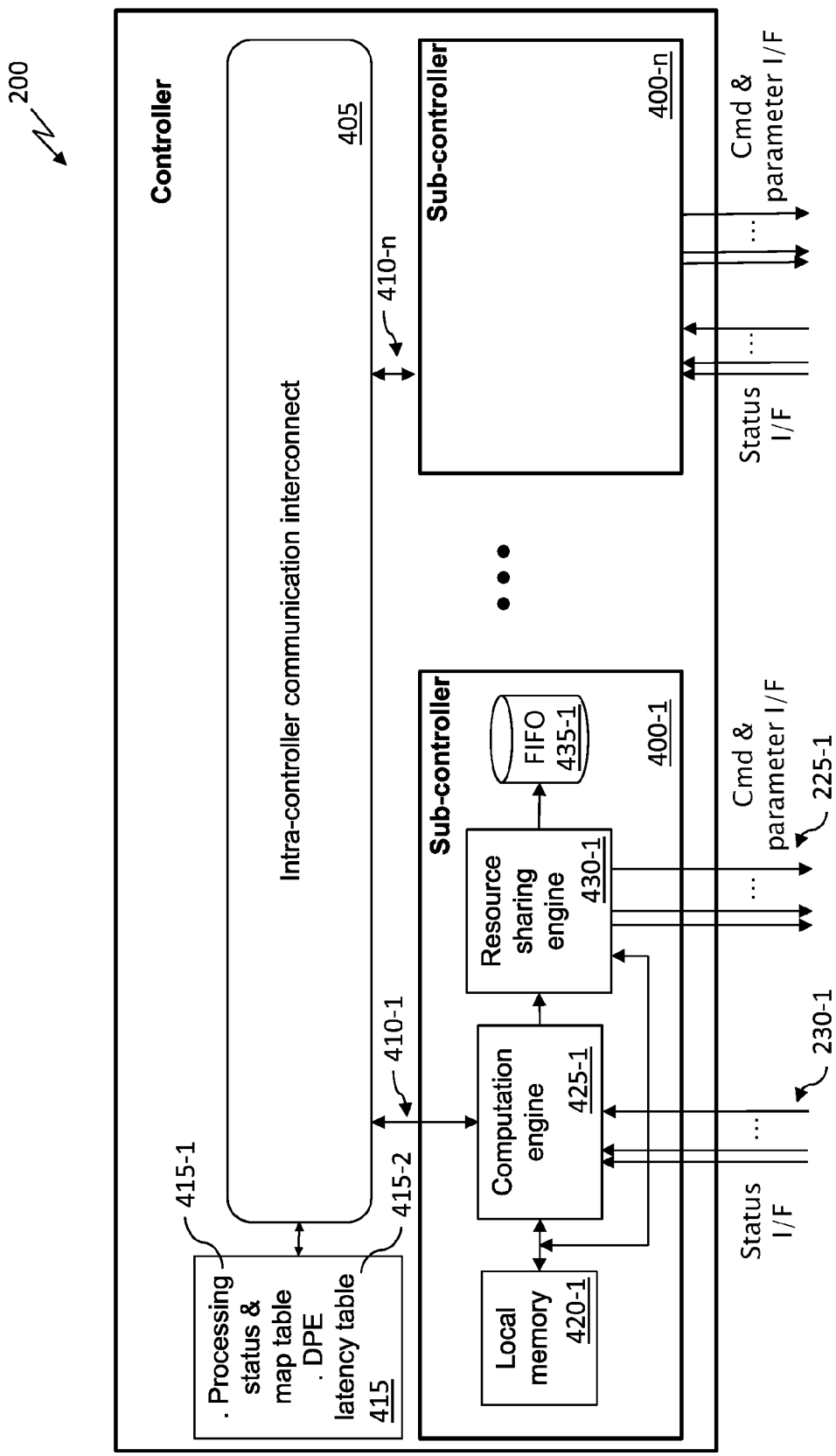
FIG. 4 illustrates an example of the structure of a controller, as described by reference to FIG. 2, comprising several sub-controller modules, to manage several data processing units.

FIG. 4 illustrates an example of the structure of a controller, as described by reference to FIG. 2, comprising several sub-controller modules (software modules), to manage several data processing units. Although the structure of only one sub-controller is illustrated for the sake of clarity, the structures of all the sub-controllers of the illustrated controller are similar. The aim of the controller is to manage, in a distributed way, several data processing units.

As illustrated, controller 200 comprises sub-controllers 400-1 to 400-n, each sub-controller being associated with one particular data processing unit via a command and parameter interface and a status interface. For example, sub-controller 400-1 is associated with data processing unit 205-1 (not represented) via command and parameter interface 225-1 and status interface 230-1. As suggested by the plurality of arrows 225-1 and 230-1, each sub-controller is independently connected to each data processing element of the corresponding data processing unit.

Sub-controllers 400-1 to 400-n are connected to each other via intra-controller communication interconnect 405 through interfaces 410-1 to 410-n, respectively. It is to be noted that intra-controller communication interconnect 405 is different from intra-processing communication interconnect 210 as described by reference to FIG. 2.

Controller 200 further comprises information tables 415 accessible from each sub-controller. It comprises, in particular, a processing status and map table 415-1 that contains information pertaining to processing sequence and latency as described by reference to FIG. 6. In addition, it advantageously comprises a DPE latency table 415-2 that contains, for each DPE (or for each corresponding DPU), a latency value representing the latency of a data processing task. Information from these tables is used by the sub-controllers for scheduling execution of data processing tasks.

According to the illustrated embodiment, each sub-controller comprises a local memory, a computation engine, a DPU resource sharing engine, and a temporary memory of the first-in first-out (FIFO) type. For the sake of illustration, local memory 420-1, computation engine 425-1, resource sharing engine 430-1, and FIFO 435-1 are associated with sub-controller 400-1.

The local memory is used, in particular, to store a status of each data processing element of the data processing unit with which the sub-controller is associated, for example a status characterizing the use of the data processing element, as well as a description of a local program to be executed and that execution is managed by the sub-controller. Such a local program is set, in particular, as a function of the processing sequences to be executed (as defined in processing status and map table 415-1).

As described by reference to FIG. 5, the status of each data processing element of a data processing unit can be stored as a resource usage status table.

The computation engine is used, in particular, for determining the type of a next data processing task to be executed at the end of the execution of a data processing task executed by a data processing element associated with the sub-controller so as to determine whether the next data processing task is to be executed locally or in another data processing unit. It is also used for handling the execution of a data processing task that an execution request has been received from another sub-controller. In other words, the computation engine generates execution requests of data processing tasks that are to be executed locally in the corresponding data processing unit or remotely in another data processing unit and handle execution requests received from other sub-controllers.

The resource sharing engine is used to trigger the execution of data processing tasks in response to execution requests generated by the computation engine. According to a particular embodiment, scheduling of task execution is carried out in accordance with the global end-to-end latency requirements for the processing sequences to which belong the data processing tasks to be executed and with a current latency status for elapsed processing tasks of the processing sequences to which belong the data processing tasks to be executed.

The temporary memory of the FIFO type is used, in particular, to store execution requests generated by the computation engine. In response to the resource sharing engine decisions, the head of the FIFO may be re-ordered dynamically.

FIG. 5 illustrates an example of a resource usage status table used to store the status of each data processing element of a data processing unit according to a particular embodiment.

One resource usage status table is associated with each data processing unit. It represents the usage state of each data processing element belonging to the data processing unit. As mentioned above, the resource usage status table can be stored in the local memory of the corresponding sub-controller (e.g. local memory 420-1 of sub-controller 400-1).

The resource usage status table can comprise, for example, as many columns as the data processing unit comprises data processing elements (e.g. k in the case of data processing unit 205-$i$ represented in FIG. 3). As illustrated in FIG. 5, the status can be, for example, 'busy' or 'free'.

According to the given example, the data processing elements having indexes 1 and k are not used while the data processing element having index 2 is currently executing a data processing task.

Each time the execution of a data processing task in a data processing element is terminated, the status of the corresponding data processing element in the resource usage status table is updated (to be set as 'free'). This is done in response to the reception of a status information via the status interface. Similarly, when the execution of a data processing task is assigned to a data processing element by the resource sharing engine, the status of this data processing element in the resource usage status table is updated (to be set as 'busy').

Figures 6, 7:
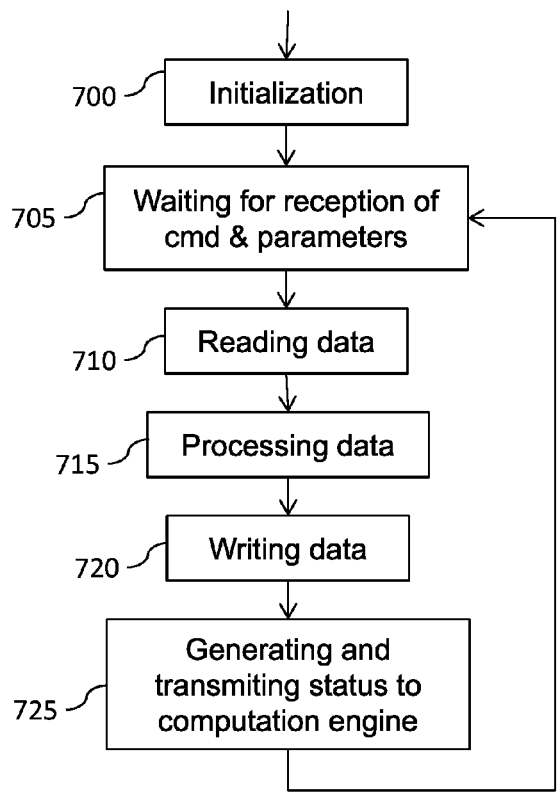
FIG. 6 illustrates an example of a processing status and map table that can be used in a data processing system according to a particular embodiment.
FIG. 7 is a flow chart illustrating steps executed in each data processing element of a data processing system according to a particular embodiment.

FIG. 6 illustrates an example of a processing status and map table that can be used in a data processing system according to a particular embodiment. Such a processing status and map table is, for example, the processing status and map table 415-1 described by reference to FIG. 4 that is used by the controller 200.

The processing status and map table is directed to gathering latency information for data processing task sequences each defined by an input port index and an output port index of the data processing system. All the processing sequences currently executed (i.e. processing sequences for which at least one data processing task is executed or is to be executed) are referenced in the processing status and map table.

As illustrated, processing status and map table 415-1 comprises 5 columns.

First column 600 represents an identifier of a data processing task sequence.

Second and third columns 605 and 610 represent an input port index and an output port index, respectively.

It is to be noted here that, according to a particular embodiment, each input and output port of the data processing system is mapped to only one I/O interface of the data processing units. Accordingly, each input port reference and each output port reference of the data processing system can be listed only once in processing status and map table 415-1. Input and/or output ports of the data processing system can be mapped dynamically to the I/O interfaces, for example as a function of the processed data processing sequence and/or of results of the processed data processing sequence.

Fourth column 615 of processing status and map table 415-1 represents a maximum latency requirement. It represents the maximum latency admitted for executing all the data processing tasks of the corresponding data processing task sequence (i.e. the maximum accumulated latency for controlling and executing each data processing task of the sequence, from obtaining data on the referenced input port to providing data to the referenced output port).

Fifth column 620 of processing status and map table 415-1 represents a current latency as computed from the beginning of the sequence. It corresponds to the accumulated latency of the executed data processing tasks of the data processing task sequence to which is added the accumulated inter-task latency (i.e. the latency induced between the end of the execution of a first data processing task and the beginning of the execution of a following data processing task of the same processing sequence). This value is updated in real-time.

For the sake of illustration, reference 625 represents a data processing task sequence having the identifier 2 that processes data obtained from input port 4 and provides resulting data to output port 17. This sequence is to be executed with a maximum latency of 100, the current latency, corresponding to the accumulated latency of the already executed data processing tasks of the sequence and of inter-task latency, being equal to 65.

Accordingly, processing status and map table is updated by controller 200 so as to keep the current latency up to date. It is also updated by an external controller, as a function of the processing sequences to be executed (the latter being typically determined by an application program).

FIG. 7 is a flow chart illustrating steps executed in each data processing element of a data processing system according to a particular embodiment. It is a high-level flowchart illustrating some aspects of the behavior of each data processing element within each data processing unit (i.e. independently of the type of the data processing unit).

After an initialization step (step 700), the data processing element waits for the reception of commands and parameters from the resource sharing engine of the corresponding sub-controller (step 705).

When commands and parameters are received, data to be processed are retrieved from a source of data to be processed as a function of the received parameters (step 710). As described above, data can be retrieved from the I/O interface (generically referred to 215 in FIG. 2) or from the intra-processing communication interconnect (reference 210 in FIG. 2).

Retrieved data are processed (step 715) and transmitted to the I/O interface or to the intra-processing communication interconnect as a function of the received parameters (step 720), that is to say to a destination of processed data.

As described above, retrieving and transmitting data can be done, in particular, by memory accesses in memory queues.

Next, a status is transmitted to the computation engine of the corresponding sub-controller (step 725) and the process is repeated until the data processing element is stopped.

The transmitted status can represent a correction/incorrect execution of the data processing task and/or can represent characteristics of the data processing task (e.g. a flag, a sequence identifier, and/or an effective processing task latency).

Figure 8:
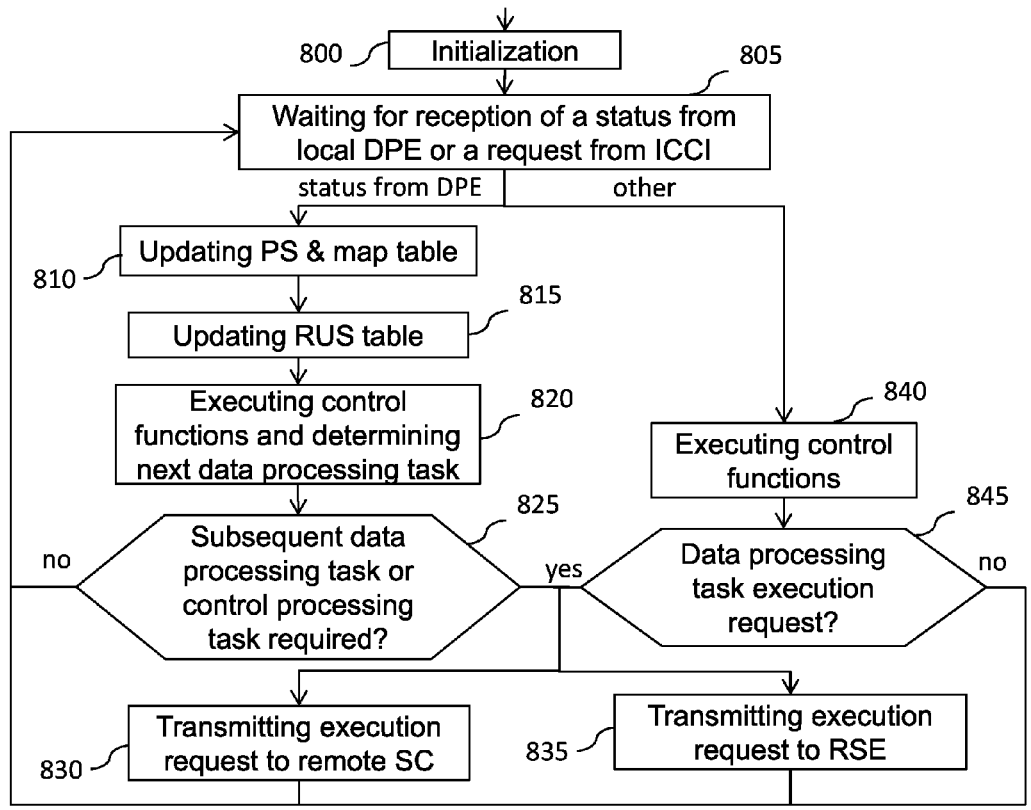
FIG. 8 is a flow chart illustrating steps executed in a computation engine of each sub-controller module of a data processing system according to a particular embodiment.

FIG. 8 is a flow chart illustrating steps executed in a computation engine of each sub-controller of a data processing system according to a particular embodiment. It is a high-level flowchart illustrating some aspects of the behavior of the computation engine of each sub-controller.

After an initialization step (step 800), the computation engine waits for the reception of a status information from a local data processing element, that is to say a data processing element of the data processing unit with which the sub-controller comprising the computation engine is associated, or a data processing task execution request received via the intra-controller communication interconnect (ICCI) from another sub-controller (step 805).

If an item of status information is received from a local data processing element (i.e. a data processing task executed by the local data processing element finishes), the processing status (PS) and map table is updated (step 810). More precisely, the current latency of the processing status and map table (column 620 in FIG. 6) is updated, for the processing sequence to which belongs the data processing tasks that finish, according to the execution task latency directed to the execution of the data processing task and the inter-task latency (or waiting latency) corresponding to the latency between the end of the execution of the previous data processing task of the same processing sequence and the data processing task that finishes.

Such an execution task latency is typically a predetermined latency. However, it can also be an effective latency of which a worst value can be estimated for optimizing scheduling of data processing task execution. It depends, for example, on the intra-processing communication interconnect architecture that can be, as described above, of the point-to-point message queue type or of the shared memory type.

It is to be noted that, alternatively, the processing status and map table can be updated according to a two-step scheme, a first update being directed to the inter-task latency and a second update being directed to the task execution latency. While the second update is to be done after a given task is executed, the first update can be carried out when the execution of the task is triggered or later.

The resource usage status (RUS) table is also updated after receiving an item of status information from a local data processing element to indicate that the data processing element is free and can be used to execute another data processing task (step 815).

Next, the local program stored in the local memory of the sub-controller is executed to perform intermediate algorithm steps or protocol processing tasks, in relation to the received status information, if needed, and the next data processing task to execute is determined (step 820).

Determining the next data processing task to execute can be based, in particular, on the availability of data at a predetermined source.

When no subsequent data processing task is to be executed or when no further control processing task is to be carried out (step 825), for example when processed data have been delivered to an external I/O interface, the algorithm is branched to step 805 to wait for the reception of an item of status information from a local data processing element or a data processing task execution request received from another sub-controller.

If a subsequent data processing task is to be executed or a further control processing task is to be carried out, a data processing task execution request is addressed to the resource sharing engine (RSE) of the sub-controller comprising the computation engine (step 830) or transmitted to a remote sub-controller (SC) according to the type of data processing task (step 835). Such a request is transmitted along with parameters like an identifier of the sequence, a pointer on data packets for obtaining the data to be processed, and/or protocol information. Next, the algorithm is branched to step 805 to wait for the reception of a status information from a local data processing element or a data processing task execution request received from another sub-controller.

If a data processing task execution request is received from another sub-controller (step 805), the local program stored in the local memory of the sub-controller is executed to perform intermediate algorithm steps or protocol processing tasks, in relation to information received along with the execution request, if needed (step 840).

Next a test is performed to determine whether or not the received execution request is directed to the execution of a data processing task (step 845). If the received execution request is not directed to the execution of a data processing task, the algorithm is branched to step 805 to wait for the reception of status information from a local data processing element or a data processing task execution request received from another sub-controller.

On the contrary, if the received execution request is directed to the execution of a data processing task, a data processing task execution request is addressed to the resource sharing engine of the sub-controller comprising the computation engine (step 830) or transmitted to a remote sub-controller according to the type of data processing task (step 835). Such a request is transmitted along with parameters such as an identifier of the sequence, a pointer on data packets for obtaining the data to be processed, and/or protocol information. Next, the algorithm is branched to step 805 to wait for the reception of status information from a local data processing element or a data processing task execution request received from another sub-controller.

Figure 9:
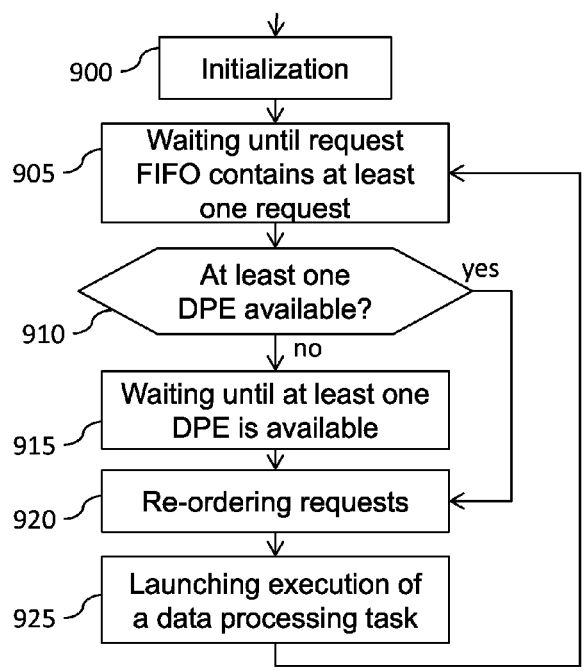
FIG. 9 is a flow chart illustrating steps executed in a resource sharing engine of each sub-controller module of a data processing system according to a particular embodiment.

FIG. 9 is a flow chart illustrating steps executed in a resource sharing engine of each sub-controller of a data processing system according to a particular embodiment. It is a high-level flowchart illustrating some aspects of the behavior of the resource sharing engine of each sub-controller.

After an initialization step (step 900), the resource sharing engine waits until the memory of the FIFO type, used to store data processing task execution requests, contains at least one execution request (step 905).

When the FIFO memory contains at least one execution request, a test is performed to determine whether or not at least one data processing element of the data processing unit to which the sub-controller comprising the resource sharing engine is associated is available, that is to say if its status in the resource usage status table stored in the local memory is 'free' (step 910).

If no data processing element is available, the resource sharing engine waits until one is available (step 915).

On the contrary, if a data processing element is available, the requests stored in the memory FIFO are parsed and the corresponding latency information (typically a maximum latency and a current latency) is obtained from the processing status and map table by using an identifier of the sequence comprising the data processing task whose execution is requested.

The latency information associated with each request stored within the FIFO memory is used to schedule the execution of the corresponding data processing tasks, that is to say to re-order the execution request in the FIFO memory (step 920), as a function of the maximum and current latencies of these memorized requests and of data processing element availability. Such a re-ordering can be based on a standard optimization algorithm, using maximum latency and current latency associated with the processing sequence whose data processing tasks have to be executed and as a function of latency associated with each data processing element (which can be stored, for example, in DPE latency table 415-2 that is accessible to each sub-controller).

Once the execution requests have been re-ordered, the first one is selected and corresponding commands and parameters are transmitted to an available data processing element for executing the corresponding data processing task (step 925). As described above, the status of the data processing element to which the commands and parameters are transmitted is updated in the resource usage status table to indicate that the data processing element is busy.

The algorithm is then branched to step 905 to handle a new execution request.

When a processing sequence is to be executed, a corresponding identifier is created in a processing status and map table. The input and output ports are determined as a function of the process to be executed and a maximum latency is determined. These parameters are memorized in the processing status and map table along with the processing sequence identifier.

Local programs, associated with data processing tasks that are to be executed or that may be executed to execute the processing sequence, are identified and stored in the local memory of the sub-controllers depending on the type of the data processing tasks. Each local program is stored with corresponding parameters such as a source of the data to be processed and a destination of processed data.

Accordingly, when data are available on an input port or via the intra-processing communication interconnect, a type of data processing task can be determined, and so an execution request can be generated in a sub-controller. An output destination can also be used to select the type of a data processing task to be executed.

Similarly, when a data processing task generates an item of output data, the destination of the generated data can be used to determine the type of the data processing task that is to process the generated data, and thus an appropriate execution request can be generated.

Therefore, the mechanism described by reference to FIGS. 7, 8, and 9 allows the execution, step by step (i.e. depending on the availability of data input for each involved data processing unit), of a processing sequence.

Naturally, in order to satisfy local and specific requirements, a person skilled in the art may apply to the solution described above many modifications and alterations all of which, however, are included within the scope of protection of the invention as defined by the following claims.

The invention claimed is:

1. A data processing system for processing system input data and providing processed data to a data output, the system comprising a plurality of data inputs and of data outputs for communicating with external elements, the data processing system comprising:
    a plurality of data processing hardware units, each data processing hardware unit being configured to process data within a predetermined latency and according to a predetermined data processing task, to provide an item of processed data;
    a memory for storing the predetermined latency for each of the data processing hardware units; and
    a controller configured to determine a data processing task to be executed as a function of a source of data to be processed or of a destination of processed data and further configured to select one data processing hardware unit as a function of the determined data processing task to be executed and of latency constraints associated with the data processing task to be executed taking into account the predetermined latencies stored in the memory, at least one source of data to be processed being linked to at least one data input of the plurality of data inputs and at least one destination of processed data being linked to at least one data output of the plurality of data outputs.

2. The data processing system according to claim 1 wherein the controller is further configured to determine a data processing task to be executed as a function of latency constraints associated with a data processing task to be executed.

3. The data processing system according to claim 1 wherein the controller is further configured to determine a data processing task to be executed as a function of data to be processed.

4. The data processing system according to claim 1 wherein each data processing hardware unit of the plurality of data processing hardware units comprises at least one input interface and at least one output interface, the at least one input interface being communicatively coupled to one data input of the plurality of data inputs of the data processing system and the at least one output interface being communicatively coupled to one data output of the plurality of data outputs of the data processing system.

5. The data processing system according to claim 1 wherein each data processing hardware unit of the plurality of data processing hardware units comprises at least one status interface communicatively coupled to the controller for transmitting a status after the execution of a data processing task in the corresponding data processing hardware unit.

6. The data processing system according to claim 1 wherein each data processing hardware unit of the plurality of data processing hardware units comprises at least one command and parameter interface for triggering the execution of a data processing task in the corresponding data processing hardware unit.

7. The data processing system according to claim 1 further comprising a data communication interconnect for transmitting processed data provided by one data processing hardware unit of the plurality of data processing hardware units to a data input of another data processing hardware unit of the plurality of data processing hardware units.

8. The data processing system according to claim 7 wherein each data processing hardware unit of the plurality of data processing hardware units comprises at least one data interface for transmitting data to the data communication interconnect and receiving data from the data communication interconnect.

9. The data processing system according to claim 1 wherein the controller comprises a plurality of sub-controller modules, each of the sub-controller modules being associated with one data processing hardware unit, each sub-controller being configured to determine a data processing task to be executed as a function of a source of data to be processed or of a destination of processed data and as a function of latency constraints associated with a data processing task to be executed.

10. The data processing system according to claim 9 further comprising a control communication interconnect for transmitting processed control commands and parameters generated by one of the plurality of sub-controller modules to one of the plurality of sub-controller modules.

11. The data processing system according to claim 9 wherein at least one data processing hardware unit comprises a plurality of data processing hardware elements, the controller being further configured to select one data processing hardware element for executing a data processing task to be executed.

12. The data processing system according to claim 11 wherein a sub-controller associated with the at least one data processing hardware unit comprising a plurality of data processing hardware elements comprises a usage status table storing a state of each data processing hardware element of the data processing hardware unit with which is associated the sub-controller.

13. The data processing system according to claim 9 wherein each sub-controller of the plurality of sub-controllers comprises a data processing task manager adapted to generate a request for executing a data processing task.

14. The data processing system according to claim 13 wherein the data processing task manager is further adapted to determine whether the data processing task whose execution is requested is to be executed in the data processing hardware unit associated with the sub-controller or in another data processing hardware unit of the plurality of data processing hardware units.

15. The data processing system according to claim 1 wherein the controller comprises a processing status and map table containing information pertaining to a maximum latency and a current latency for at least one set of data processing tasks.

16. The data processing system according to claim 15 wherein the content of the at least one set of data processing tasks is dynamically modified.

17. The data processing system according to claim 1 wherein the controller dynamically updates the processing status and map table.

* * * * *